United States Patent
Jung et al.

(10) Patent No.: US 8,228,574 B2
(45) Date of Patent: Jul. 24, 2012

(54) HOLOGRAPHIC DATA STORAGE MEDIUM AND APPARATUS AND METHOD FOR RECORDING/REPRODUCING HOLOGRAPHIC DATA TO/FROM THE SAME

(75) Inventors: Moon-Il Jung, Suwon-si (KR); Young-min Cheong, Seoul (KR); Taek-seong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 12/139,549

(22) Filed: Jun. 16, 2008

(65) Prior Publication Data

US 2009/0153927 A1    Jun. 18, 2009

(30) Foreign Application Priority Data

Dec. 12, 2007    (KR) .................. 10-2007-128753

(51) Int. Cl.
    *G03H 1/02*    (2006.01)
(52) U.S. Cl. ............................... 359/3; 359/25
(58) Field of Classification Search ................ 359/3, 25; 369/103
    See application file for complete search history.

(56) References Cited

U.S. PATENT DOCUMENTS

| | | | | |
|---|---|---|---|---|
| 4,888,260 A * | 12/1989 | Cowan | | 430/1 |
| 5,504,593 A * | 4/1996 | Hotta et al. | | 359/1 |
| 6,020,985 A | 2/2000 | McLeod et al. | | |
| 7,164,514 B2 * | 1/2007 | Raguin | | 359/3 |
| 7,342,697 B2 * | 3/2008 | Uno et al. | | 359/24 |
| 2004/0103136 A1 * | 5/2004 | Harding | | 709/200 |
| 2005/0200928 A1 | 9/2005 | Mori et al. | | |
| 2007/0077498 A1 * | 4/2007 | Yumoto et al. | | 430/1 |
| 2007/0189147 A1 * | 8/2007 | Miyamoto et al. | | 369/275.1 |

FOREIGN PATENT DOCUMENTS

| | | |
|---|---|---|
| CN | 1774748 A | 5/2006 |
| JP | 11-126335 A | 5/1999 |
| JP | 2002-513981 | 5/2002 |
| KR | 10-0578200 | 5/2006 |
| KR | 2007-104357 | 10/2007 |
| WO | WO 99/57719 | 11/1999 |
| WO | WO 2004/051634 | 6/2004 |

OTHER PUBLICATIONS

Search Report issued in PCT International Application No. PCT/KR2008/002845 on Dec. 2, 2008.
International Search Report and Written Opinion of the International Searching Authority issued on Dec. 2, 2008, in counterpart International Application No. PCT/KR2008/002845 (10 pages).
Extended European Search Report issued on Oct. 27, 2010, in counterpart European Application No. 08753640.5 (7 pages).
Office Action dated Nov. 24, 2011, in corresponding Chinese Patent Application No. 200880120664.4.

* cited by examiner

*Primary Examiner* — Frank Font
(74) *Attorney, Agent, or Firm* — NSIP Law (57) ABSTRACT

A holographic data storage medium and an apparatus and method for recording/reproducing holographic data using the same. The holographic data storage medium includes a substrate; a holographic recording layer disposed on the substrate; and a cover layer covering the holographic recording layer. The holographic recording layer includes a data recording region including a plurality of data layers to which data is recorded, the data recording region in which interference fringes due to first and second beams are formed in different data layers in a depthwise direction; and a layer discrimination region for providing discrimination between the data layers.

28 Claims, 9 Drawing Sheets

HOLOGRAPHIC DATA STORAGE MEDIUM AND APPARATUS AND METHOD FOR RECORDING/REPRODUCING HOLOGRAPHIC DATA TO/FROM THE SAME

CROSS-REFERENCE TO RELATED APPLICATIONS

This application claims the benefit of Korean Patent Application No. 2007-128753 filed on Dec. 12, 2007, in the Korean Intellectual Property Office, the disclosure of which is incorporated herein by reference.

BACKGROUND OF THE INVENTION

1. Field of the Invention

The present invention relates to a holographic data storage medium and an apparatus and method for recording/reproducing data to/from the same, and more particularly, to a holographic data storage medium, which provides discrimination between a plurality of data layers to which data is recorded, and an apparatus and method for recording/reproducing holographic data to/from the same.

2. Description of the Related Art

In recent years, data storage technology using holograms has attracted considerable attention. A method of storing data using holograms includes storing data in the shape of optical interference fringes in inorganic crystals or polymer materials that are sensitive to light. An optical interference fringe is formed by two laser beams with interference. That is, a reference beam and a signal beam with different paths interfere with each other to form an interference fringe that causes chemical or physical changes to a photosensitive storage medium, thus recording data in the photosensitive storage medium. In order to reproduce data from the recorded interference pattern, the reference beam similar to a beam used for recording the data is irradiated to the interference pattern recorded in the photosensitive storage medium. As a result, diffraction occurs due to the interference pattern, so that the signal beam is restored to reproduce the data.

The above-described hologram data storage technology may be divided into a volume holography method in which data is recorded and reproduced in page units using volume holography and a micro-holography method in which data is recorded and reproduced bit by bit using micro-holography. In the volume holography method, a vast amount of data can be processed at the same time; however, it is difficult to make data storage devices commercially available since an optical system should be adjusted very finely.

In the micro-holography method, a signal beam is interfered with a reference beam at a focus to form a fine interference fringe, and a plurality of the fine interference fringe are formed on a plane of a storage medium so that a large amount of data is recorded to form a data layer. The recorded data can be reproduced by irradiating a reference beam to the interference fringe. A volume holographic recording layer is formed so that a plurality of data layers in which data is recorded due to the interference fringe can be formed in a depthwise direction of the volume holographic recording layer. That is, foci of the signal beam and the reference beam are changed in the depthwise direction of the volume holographic recording layer and thus, the plurality of data layers in which data is recorded are formed, thereby three-dimensionally recording data in the volume holographic recording layer.

SUMMARY OF THE INVENTION

Several aspects and example embodiments of the present invention provide a holographic data storage medium in which a plurality of data layers can be discriminated in a volume holographic recording layer and an apparatus and method for recording/reproducing holographic data to/from the same.

Additional aspects and/or advantages of the invention will be set forth in part in the description which follows and, in part, will be obvious from the description, or may be learned by practice of the invention.

In accordance with an example embodiment of the present invention, there is provided a holographic data storage medium including a substrate; a holographic recording layer disposed on the substrate; and a cover layer covering the holographic recording layer. The holographic recording layer includes a data recording region including a plurality of data layers to which data is recorded, the data recording region in which interference fringes due to first and second beams are formed in different data layers in a depthwise direction; and a layer discrimination region for providing discrimination between the data layers.

According to an aspect of the present invention, the layer discrimination region of the holographic recording layer includes a plurality of reflection layers, which are stacked on the substrate and correspond to the data layers, respectively.

According to another aspect of the present invention, the layer discrimination region of the holographic recording layer includes a plurality of reflection layers, which are stepped in a staircase shape and correspond to the data layers, respectively, and each of the reflection layers stores layer discrimination data of the corresponding data layer.

According to an aspect of the present invention, the holographic recording layer has a disk shape, and the layer discrimination region is disposed near an inner circumferential area or an outer circumferential area of the disk-shaped holographic recording layer.

According to another aspect of the present invention, the data recording region of the holographic recording layer is formed of a photosensitive material selected from one of a photo-polymer and a thermoplastic resin.

According to another aspect of the present invention, the holographic data storage medium is a transmissive-type in which the substrate and the cover layer are formed of a transparent material, which transmits the first and second beams, such that the first and second beams are incident to both sides of the holographic recording layer disposed between the substrate and the cover layer.

According to another aspect of the present invention, the holographic data storage medium is a reflective-type in which a reflection layer is interposed between the substrate and the holographic recording layer such that the first and second beams are incident to the holographic recording layer through the cover layer.

According to an aspect of the present invention, the reflection layer in the layer discrimination region is formed of a cholesteric liquid crystal (CLC) material.

According to another aspect of the present invention, the reflection layer in the layer discrimination region is a liquid crystal (LC) film that is in a liquid state or cured.

According to another aspect of the present invention, the reflection layer in the layer discrimination region includes a single liquid crystal (LC) layer or a plurality of LC layers with different LC-molecule helical periods.

According to another aspect of the present invention, the holographic data storage medium is further provided with a servo layer for recording servo data disposed between the substrate and the reflection layer, between the reflection layer and the holographic recording layer, in the holographic recording layer, or between the holographic recording layer and the cover layer; and a space layer disposed between the reflection layer and the holographic recording layer.

In accordance with another example embodiment of the present invention, there is provided a holographic data recording/reproducing apparatus for reproducing data from a holographic data storage medium. The holographic data storage medium includes a holographic recording layer including a data recording region with a plurality of data layers to which data is recorded, in which interference fringes due to first and second beams are formed in different data layers in a depthwise direction; and a layer discrimination region for providing discrimination between the data layers. The apparatus includes an optical pickup unit for irradiating light to the layer discrimination region to read layer discrimination data stored in the layer discrimination region and recording data or reading recorded data based on the layer discrimination data.

In accordance with yet another example embodiment of the present invention, there is provided a method of recording/ reproducing holographic data. In the method, data is reproduced from a holographic data storage medium, which includes a holographic recording layer including a data recording region with a plurality of data layers to which data is recorded, the data recording region in which interference fringes due to first and second beams are formed in different data layers in a depthwise direction, and a layer discrimination region for providing discrimination between the data layers. In the method, a data layer for recording data or reading recorded data is discriminated based on layer discrimination data stored in the layer discrimination region.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
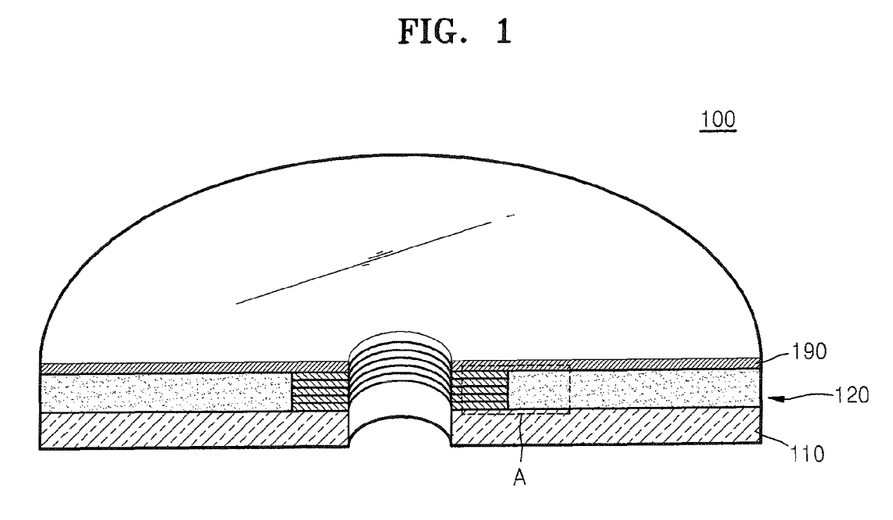
FIG. 1 is a cross-sectional perspective view of a holographic data storage medium according to an example embodiment of the present invention.
Figure 2:
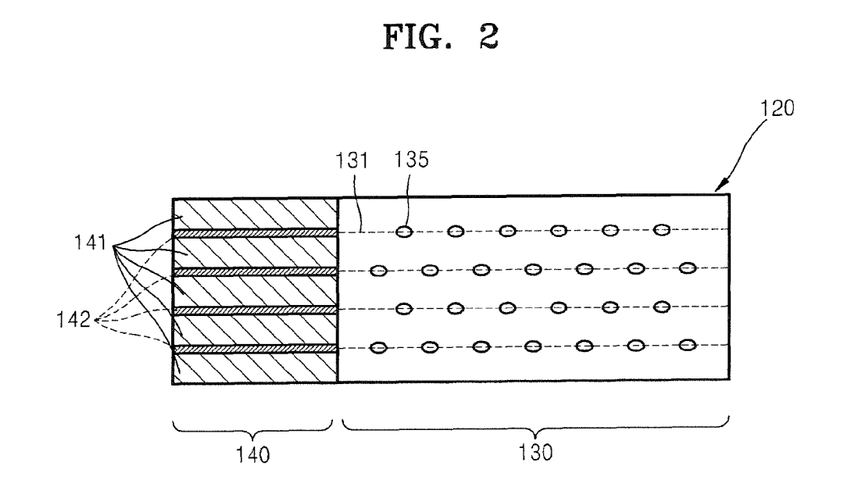
FIG. 2 is a magnified cross-sectional view of region "A" of FIG. 1.

FIG. 1 is a cross-sectional perspective view of a holographic data storage medium 100 according to an example embodiment of the present invention, and FIG. 2 is a magnified cross-sectional view of region "A" of FIG. 1.

Referring to FIG. 1, the holographic data storage medium 100 is a transmissive-type of an optical storage medium in which a substrate 110, a holographic recording layer 120, and a cover layer 190 are sequentially stacked.

The substrate 110 is a support prepared to maintain the shape of the holographic data storage medium 100 with a disk shape. The substrate 110 may be formed of polycarbonate resin or acryl resin. The cover layer 190 is used to protect the holographic recording layer 120. In addition, the cover layer 190 may also function to maintain the shape of the holographic data storage medium 100 when the holographic recording layer 120 is not formed of a solid material. A signal beam and a reference beam are incident to the holographic recording layer 120 through the substrate 110 and the cover layer 190, respectively, to record data. Although not shown in FIG. 1, a servo layer in which servo data for tracking is stored may be prepared.

Referring to FIG. 2, the holographic recording layer 120 disposed between the substrate 110 and the cover layer 190 of the holographic data storage medium 100, shown in FIG. 1, includes a data recording region 130 and a layer discrimination region 140.

The data recording region 130 may be formed of a photosensitive material, for example, photo-polymer or a thermoplastic material, in which data can be recorded using a recording mark 135 caused by an interference fringe. When a photosensitive material absorbs light, its refractive index is changed. Generally, the refractive index of a photosensitive material is proportional to an optical intensity of light. The data recording region 130 has a volume, and a plurality of recording marks 135 caused by interference fringes may be formed in a vertical direction. Thus, a plurality of layers to which data is recorded will be hereinafter referred to as data layers 131.

A photosensitive material may have a nonlinear characteristic so that the photosensitive material can have a predetermined critical value and react with only a beam with the critical value or higher. In this case, when a plurality of data layers 131 are formed in a depthwise direction of the data recording region 130, as a data layer 131 grows distant from a focal position, the intensity of an interference fringe weakens abruptly, so that data can be densely recorded in multiple layers to increase recording density of the holographic data storage medium 100.

The layer discrimination region 140 includes a plurality of reflection layers 142 corresponding to the data layers 131 and a plurality of transparent space layers 141 interposed between the reflection layers 142. Specifically, in the example embodiment, shown in FIG. 2, the layer discrimination region 140 includes the reflection layers 142 corresponding respectively to the data layers 131 so that the data layers 131 can be discriminated due to beams reflected by the reflection layers 142. A multilayered structure of the layer discrimination region 140 is substantially the same as that of an ordinary optical disc, such as, for example, a digital versatile (or video) disc (DVD) or a Blu-ray disc (BD).

The layer discrimination region 140 may be located near an inner circumferential area of the disk-shaped holographic data storage medium 100, as shown in FIG. 1. However, the present invention is not limited thereto. For example, the layer discrimination region 140 may be located near an outer circumferential area of the disk-shaped holographic data storage medium 100. Furthermore, the holographic data storage medium 100 according to the present embodiment is not limited to a disk shape, and the layer discrimination region 140 has only to be a region that is discriminable from the data recording region 130.

Each of the reflection layers 142 of the layer discrimination region 140 may store layer number data of the corresponding data layer 131. Since the reflection layer 142 can determine the height of the data layer 131 on its own, the reflection layer 142 itself may be the layer number data. Furthermore, the layer number data may be information on the actual number of the data layers 131. In addition to the layer number data, data peculiar to each of the data layers 131 may also be written to the corresponding reflection layer 142. Also, information on the holographic data storage medium 100 may be written to each of the reflection layers 142 by pits, wobbles, or other marks.

Figure 3:
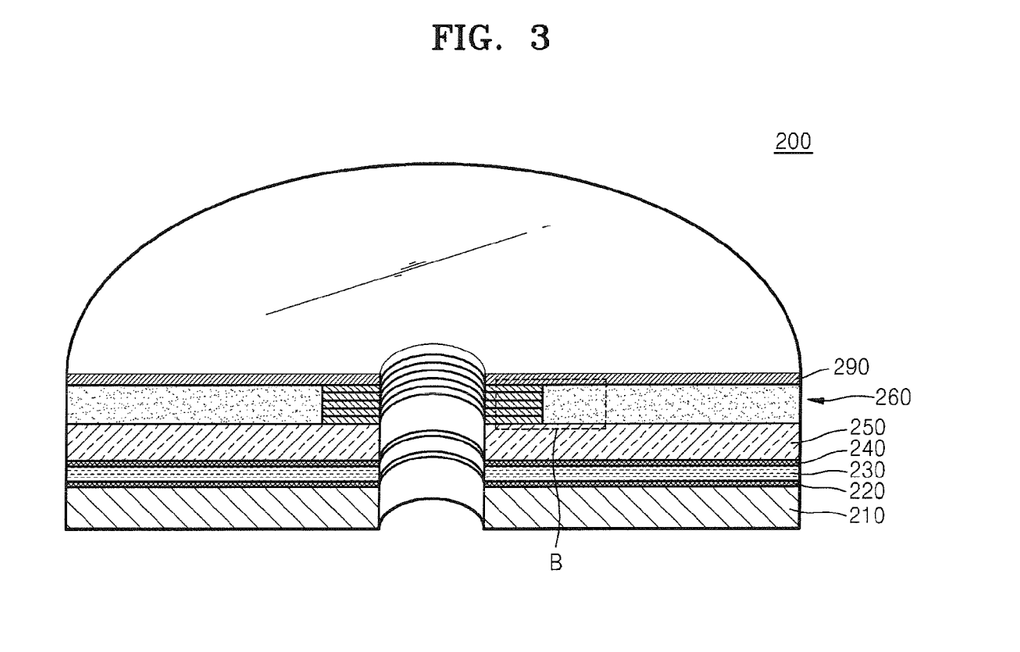
FIG. 3 is a cross-sectional perspective view of a holographic data storage medium according to another example embodiment of the present invention.
Figure 4:
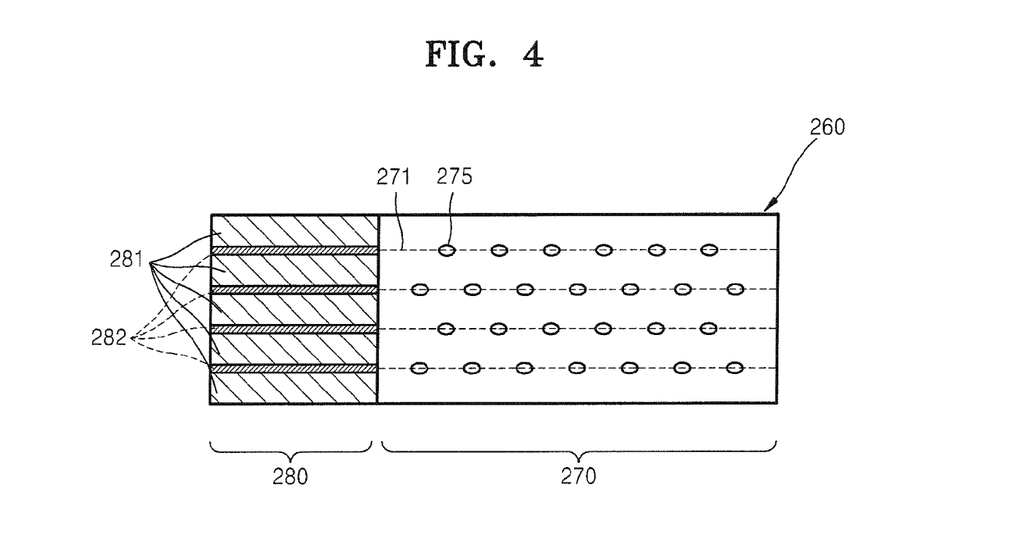
FIG. 4 is a magnified cross-sectional view of region "B" of FIG. 3.

FIG. 3 is a cross-sectional perspective view of a holographic data storage medium 200 according to another example embodiment of the present invention, and FIG. 4 is a magnified cross-sectional view of region "B" of FIG. 3.

Referring to FIG. 3, the holographic data storage medium 200 is a reflective-type of an storage medium in which a substrate 210, a servo layer 220, a buffer layer 230, a reflection layer 240, a space layer 250, a holographic recording layer 260, and a cover layer 290 are sequentially stacked. For brevity, it is assumed that the substrate 210 is a bottom side and the cover layer 290 is a top side.

The substrate 210 is a support prepared to maintain the shape of the holographic data storage medium 200 with a disk shape. The substrate 210 may be formed of polycarbonate resin or acryl resin.

The cover layer 290 is used to protect the holographic recording layer 260. In addition, the cover layer 290 may also function to maintain the shape of the holographic data storage medium 200 when the holographic recording layer 260 is not formed of a solid material. An anti-reflection layer (not shown) for inhibiting surface reflection may be further prepared on the cover layer 290. A signal beam and a reference beam are incident to the holographic recording layer 260 through the cover layer 290 to record data.

The space layer 250 is used to secure space between the holographic recording layer 260 and the reflection layer 240. When recording marks 275, as shown in FIG. 4, are formed in the holographic recording layer 260, a distance between the reflection layer 240 and the recording marks 275 can be secured by the space layer 250. The thickness of the space layer 250, which varies with the performance of the holographic recording layer 260, may range from about 0 to 100 μm. When the distance between the reflection layer 240 and the recording marks 275 is secured, noise due to light that is partially reflected by the reflection layer 240 during reproduction of data can be reduced. The space layer 250 is not necessarily provided in the present invention, and a portion of the holographic recording layer 250 may be not used for recording of data, but employed as a space layer.

When first and second circularly polarized beams intersect each other, the reflection layer 240 may be formed of a polarization-selective material that reflects the first circularly polarized beam and transmits the second circularly polarized beam. Also, the reflection layer 240 may maintain a polarization direction of the reflected first circularly polarized beam. The reflection layer 240 may be a cholesteric liquid crystal (CLC) film that is in a liquid state or cured. A CLC has a spirally twisted structure, which reflects a circularly polarized beam traveling in a spiral direction and transmits a circularly polarized beam traveling in an opposite direction to the spiral direction, so that the CLC can separate light into two circularly polarized beams that intersect each other, and the reflected beam maintains its original circular polarization. However, the reflection layer 240 according to the present embodiment is not limited to a polarization-selective material; rather, such a reflection layer 240 may be an ordinary reflection layer that reflects light in an opposite direction to a circularly polarized direction. In this case, the first and second circularly polarized beams are incident to the holographic recording layer 260 through the cover layer 290 in the same polarization direction.

The buffer layer 250 is interposed between the reflection layer 240 and the servo layer 220 and may be formed of a transparent material or a material that absorbs light with a wavelength for recording/reproducing data. The buffer layer 250 fills spaces between servo data patterns formed in the servo layer 220 to flatten the reflection layer 240.

The servo layer 220 stores servo data and reflects servo light. In the current embodiment, the wavelength of the servo light is controlled to be different from the wavelength of light for recording/reproducing data. Also, layers disposed on the servo layer 220, namely, the buffer layer 230, the reflection layer 240, the space layer 250, the holographic recording layer 260, and the cover layer 270, are designed to transmit the servo light.

Referring to FIG. 4, the holographic recording layer 260 disposed between the substrate 210 and the cover layer 290 of the holographic data storage medium 200, shown in FIG. 3, includes a data recording region 270 and a layer discrimination region 280.

The data recording region 270 may be formed of a photosensitive material, for example, photo-polymer or a thermoplastic material, in which data can be recorded using a recording mark 275 caused by an interference fringe.

The layer discrimination region 280 includes a plurality of reflection layers 282 corresponding to data layers 271 formed in the data recording region 270 and a plurality of transparent space layers 281 interposed between the reflection layers 282. Specifically, in the present embodiment, the layer discrimination region 280 includes the reflection layers 282 corresponding respectively to the data layers 271 so that the data layers 271 can be discriminated due to beams reflected by the reflection layers 282. The layer discrimination region 280 is substantially the same as the layer discrimination region 140 described with reference to FIG. 2 and thus, a repeated description will be omitted here.

Figure 5:
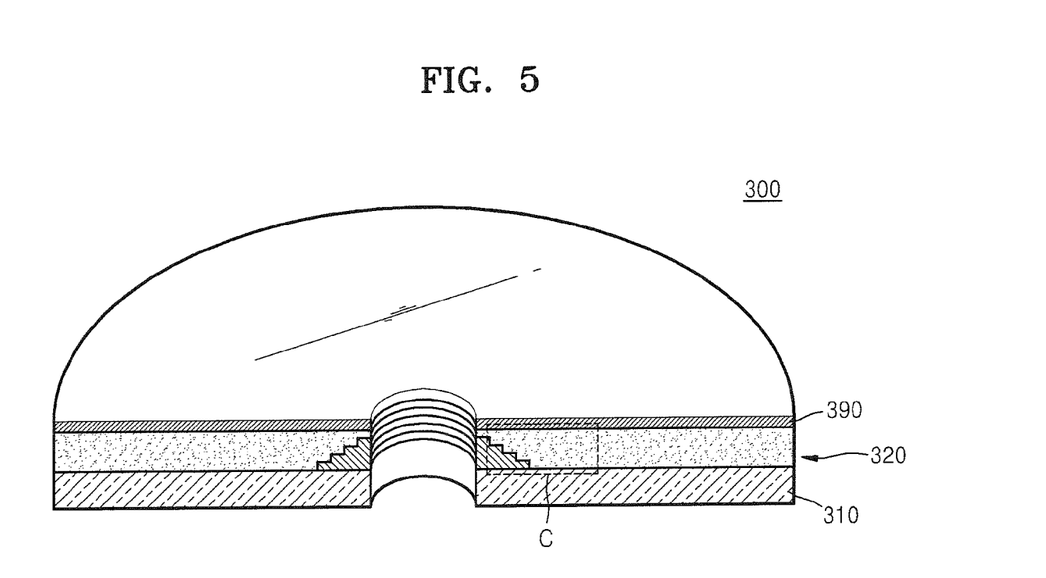
FIG. 5 is a cross-sectional perspective view of a holographic data storage medium according to another example embodiment of the present invention.
Figure 6:
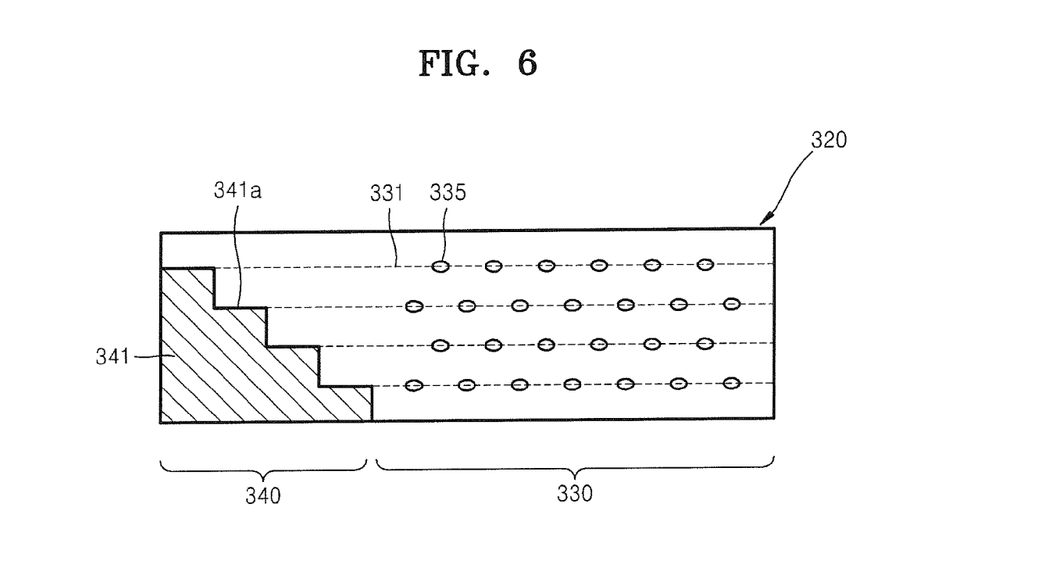
FIG. 6 is a magnified cross-sectional view of region "C" of FIG. 5.

FIG. 5 is a cross-sectional perspective view of a holographic data storage medium 300 according to another example embodiment of the present invention, and FIG. 6 is a magnified cross-sectional view of region "C" of FIG. 5.

Referring to FIG. 5, the holographic data storage medium 300 is a transmissive-type of an optical storage medium in which a substrate 310, a holographic recording layer 320, and a cover layer 390 are sequentially stacked.

In the current embodiment, since the holographic data storage medium 300 is substantially the same as the holographic data storage medium 100 described with reference to FIGS. 1 and 2 except a layer discrimination region 340, a repeated description will be omitted and differences will be explained.

Referring to FIG. 6, the holographic recording layer 320 disposed between the substrate 310 and the cover layer 390 of the holographic data storage medium 100, shown in FIG. 5, includes a data recording region 330 and the layer discrimination region 340.

The data recording region 330 may be formed of a photo-sensitive material, for example, photo-polymer or a thermoplastic material, in which data can be recorded using a recording mark 335 caused by an interference fringe.

The layer discrimination region 340 includes a staircase 341 having a plurality of reflection layers 341a corresponding respectively to data layers 331 formed in the data recording region 330. The staircase 341 is formed of a transparent material, and the reflection layers 341a may be formed by coating stairs parallel to the data layers 331 with a reflective material. Alternatively, the staircase 341 may be formed of a reflective material so that its stairs may be the reflection layers 341a. The staircase 341 has only to be formed of a material with a different refractive index from the data recording region 330 formed of a photosensitive material and have a predetermined reflection rate.

The layer discrimination region 340 may be located near an inner circumferential area of the disk-shaped holographic data storage medium 300 as shown in FIG. 5, but the present invention is not limited thereto. For example, the layer discrimination region 340 may be located near an outer circumferential area of the disk-shaped holographic data storage medium 300. Furthermore, the holographic data storage medium 300 according to the present embodiment is not limited to a disk shape, and the layer discrimination region 340 has only to be a region that is discriminable from the data recording region 330.

Each of the reflection layers 341a of the layer discrimination region 340 may store layer number data of the corresponding data layer 331. Since the reflection layer 341a can discriminate the data layers 331 and determine the height of the data layer 331 on its own, the reflection layer 341a itself may be the layer number data. Furthermore, the layer number data may be information on the actual number of the data layers 331. In addition to the layer number data, data peculiar to each of the data layers 331 may be written to the corresponding reflection layer 341a. Also, data on the holographic data storage medium 300 may be written to each of the reflection layers 341 a by pits or marks. In this case, each of the reflection layers 341a has a sufficient track pitch to record the data on the holographic data storage medium 300 thereto.

Figure 7:
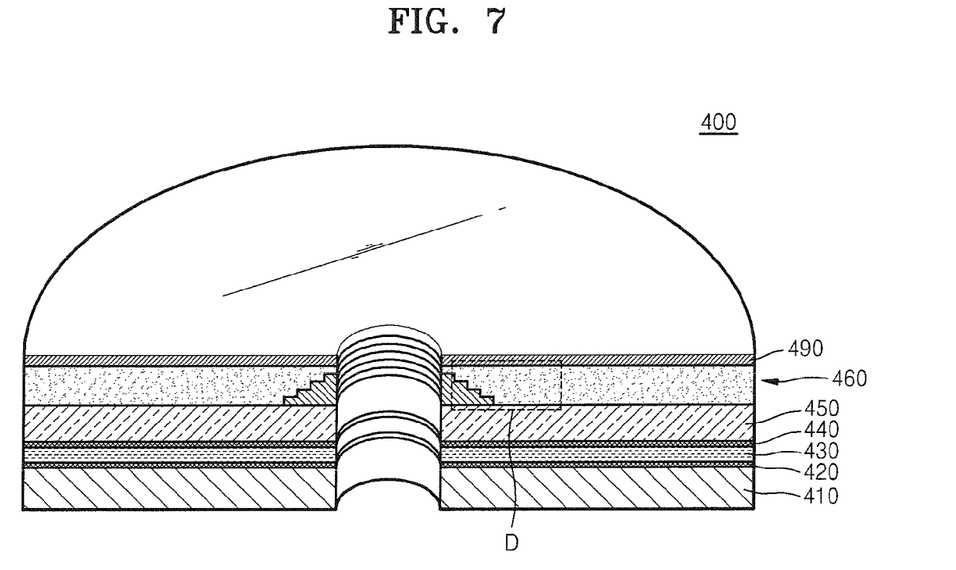
FIG. 7 is a cross-sectional perspective view of a holographic data storage medium according to another example embodiment of the present invention.
Figure 8:
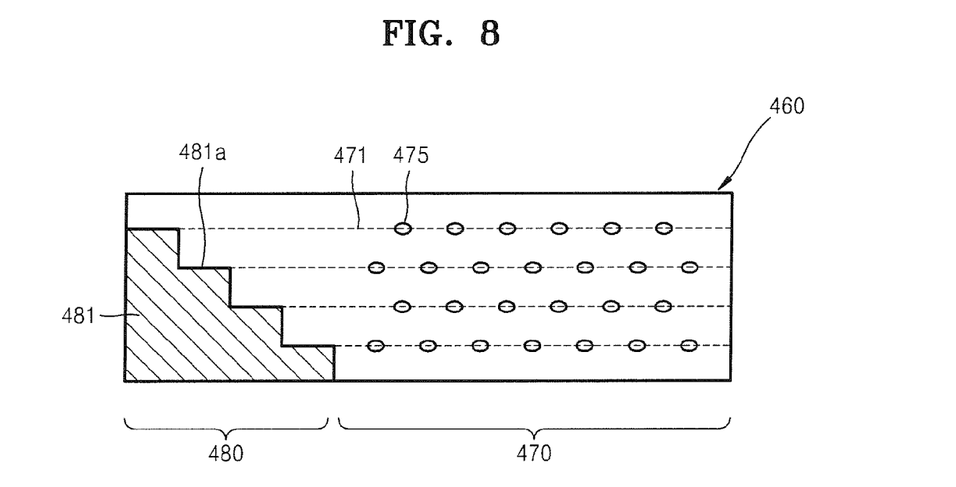
FIG. 8 is a magnified cross-sectional view of region "D" of FIG. 7.

FIG. 7 is a cross-sectional perspective view of a holographic data storage medium 400 according to another example embodiment of the present invention, and FIG. 8 is a magnified cross-sectional view of region "D" of FIG. 7.

Referring to FIG. 7, the holographic data storage medium 400 is a reflective storage medium in which a substrate 410, a servo layer 420, a buffer layer 430, a reflection layer 440, a space layer 450, a holographic recording layer 460, and a cover layer 490 are sequentially stacked.

In the current embodiment, since the holographic data storage medium 400 is substantially the same as the holographic data storage medium 200 described with reference to FIGS. 3 and 4 except a layer discrimination region 480, a repeated description will be omitted and differences will be explained.

Referring to FIG. 8, the holographic recording layer 460 disposed between the substrate 410 and the cover layer 490 of the holographic data storage medium 400, shown in FIG. 7, includes a data recording region 470 and the layer discrimination region 480.

The data recording region 470 may be formed of a photo-sensitive material, for example, photo-polymer or a thermoplastic material, in which data can be recorded using a recording mark 475 caused by an interference fringe.

The layer discrimination region 480 includes a staircase 481 having a plurality of reflection layers 481a corresponding respectively to data layers 471 formed in the data recording region 470. The staircase 481 is formed of a transparent material, and the reflection layers 481a may be formed by coating stairs parallel to the data layers 471 with a reflective material. Alternatively, the staircase 481 may be formed of a reflective material so that its stairs may be the reflection layers 481a. The staircase 481 has only to be formed of a material with a different refractive index from the data recording region 470 formed of a photosensitive material and have a predetermined reflection rate.

Each of the reflection layers 481a of the layer discrimination region 480 may store layer number data of the corresponding data layer 471. In addition to the layer number data, data peculiar to each of the data layers 471 may be written to the corresponding reflection layer 481a by pits or marks. In this case, each of the reflection layers 481a has a sufficient track pitch to record the data peculiar to the corresponding data layer 471 thereto.

Hereinafter, an apparatus and method for recording/reproducing holographic data to/from a holographic data storage medium according to example embodiments of the present invention will be described.

Figure 9:
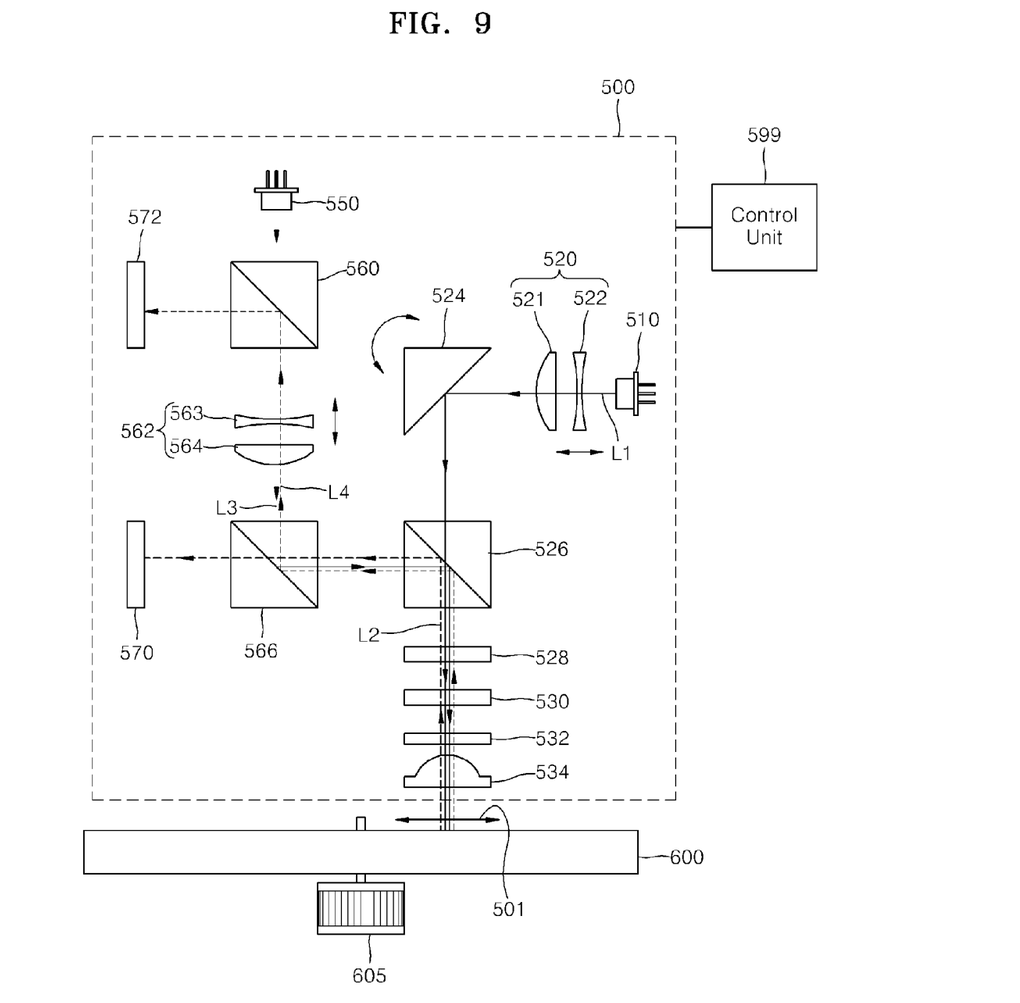
FIG. 9 is a view showing the construction of a holographic data recording/reproduction apparatus according to an example embodiment of the present invention.
Figure 10:
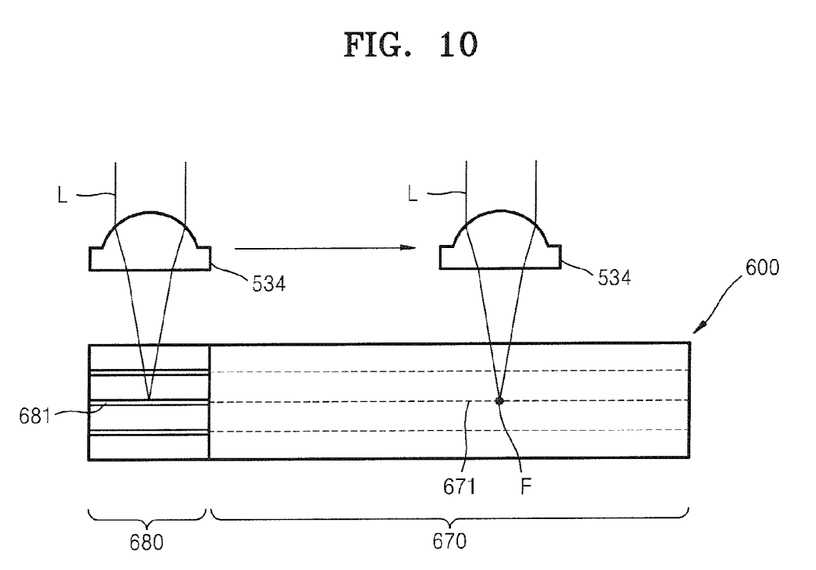
FIG. 10 is a diagram illustrating a method of discriminating a data layer to/from which data is to be recorded or reproduced in the holographic data recording/reproduction apparatus shown in FIG. 9.
Figure 11:
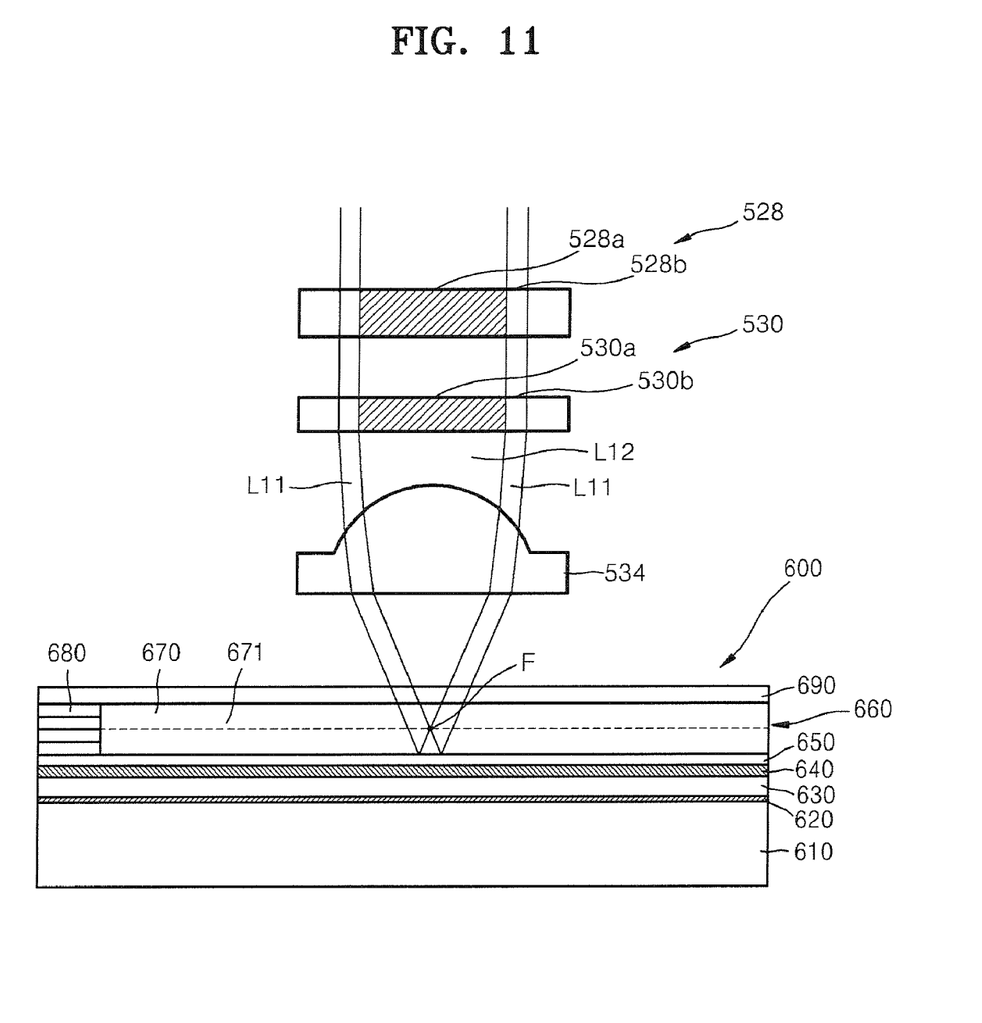
FIG. 11 is a diagram illustrating a method of recording data in the holographic data recording/reproduction apparatus shown in FIG. 9.

FIG. 9 is a view showing the construction of a holographic data recording/reproduction apparatus according to an example embodiment of the present invention, FIG. 10 is a diagram illustrating a method of discriminating a data layer to/from which data is to be recorded or reproduced in the holographic data recording/reproduction apparatus shown in FIG. 9, and FIG. 11 is a diagram illustrating a method of recording data in the holographic data recording/reproduction apparatus shown in FIG. 9.

To begin with, the holographic data recording/reproduction apparatus according to the present embodiment will be described with reference to FIG. 9.

Referring to FIG. 9, a holographic data recording/reproduction apparatus records data to a holographic data storage medium 600 and reproduces the recorded data. As shown in FIG. 9, the holographic recording/reproduction apparatus includes an optical pickup unit 500, which irradiates light to a single side of the holographic data storage medium 600 and receives the irradiated light, and a control unit 599.

The optical pickup unit 500 may include first and second light sources 510 and 550, first and second focus control units 520 and 562, a light path converter 524, first, second, and third beam splitters 526, 560, 566, a polarization converter 528, a polarization-selective refractor 530, a quarter-wave plate 532, an objective lens 534, and first and second photo-diodes (PDs) 570 and 572.

The first light source 510 emits the recording/reproduction beam L1. For example, the first light source 510 may be a semiconductor laser diode (LD) for emitting blue light. The first light source 510 may emit mainly linearly polarized light, for example, P-polarized light. A polarization direction of light emitted by the first light source 510 is taken for brevity, and the present invention is not limited thereto. The first light source 510 emits P-polarized light L that is modulated according to data to be recorded in a recording mode, while the first light source 510 emits un-modulated P-polarized light L in a reproduction mode.

Figure 13:
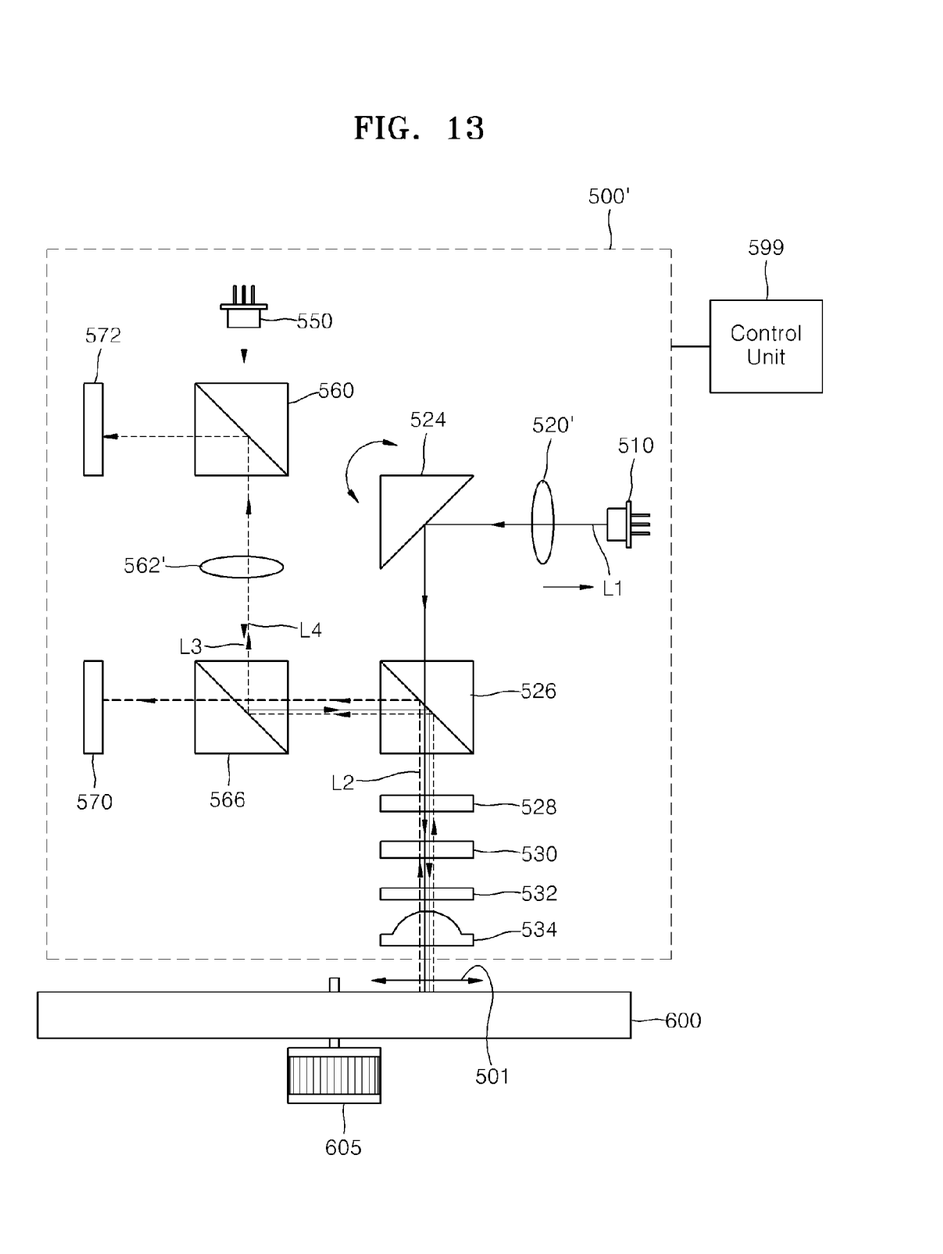
FIG. 13 is a view showing the construction of a holographic data recording/reproduction apparatus according to another example embodiment of the present invention.

The first focus control unit 520 may be a beam expander that includes a group of relay lenses 521 and 522, as shown in FIG. 9. In this case, at least one lens (e.g., the lens 521) of the group of relay lenses 521 and 522 may be movably installed in an optical axis direction and driven by a driver unit (not shown). Thus, at least one lens (i.e., the lens 521) of the group of relay lenses 521 and 522 is moved along the optical axis direction, so that the first focus control unit 520 can vary a focal position of the recording/reproduction beam L1, in the holographic data storage medium 600. The first focus control unit 520 enables the recording of data in a plurality of layers of the holographic data storage medium 600. In other words, when the recording/reproduction beam L1 converges into a focus (refer to F, shown in FIG. 10) in the holographic data storage medium 600, a data layer (refer to 671, shown in FIG. 10) is formed. Also, since the focal position of the recording/reproduction beam L is varied by the first focus control unit 520, another data layer 671 is formed, thereby recording data in a plurality of data layers 671. In the current embodiment, the beam expander including the group of relay lenses 521 and 522 is taken as an example of the first focus control unit 520, but the present invention is not limited thereto. That is, the first focus control unit 520 may be embodied using a liquid crystal (LC) lens 520' in an optical pickup unit 500' as shown in FIG. 13. Thus, a voltage is applied to the LC lens so that predetermined polarized light is refracted due to alignment of LCs. Since the construction of the LC lens is known to one of ordinary skill, a detailed description thereof will be omitted. In the present embodiment, although a signal beam has a longer focal length than a reference beam as described later, the signal beam and the reference beam form the same light path and thus, a focal difference between the signal beam and the reference beam is made by the polarization-selective refractor 530 that will be described later.

The light path converter 524 is a mirror for appropriately folding a light path and allows an optical device to be appropriately disposed in the optical pickup unit 500. Also, the light path converter 524 two-dimensionally may move a reflection surface in response to a tilt of the holographic data storage medium 600 so that the optical pickup unit 500 corresponds to the tilt of the holographic data storage medium 600.

The first beam splitter 526 may function as a polarization beam splitter for the recording/reproduction beam L1, which is emitted by the first light source 510, and function as a simple reflection mirror for a servo beam L3 emitted by the second light source 550. In this case, the recording/reproduction beam L1 and the servo beam L3 are prepared to have different wavelengths so that the recording/reproduction beam L1 can have different reflective characteristics from the servo beam L3. Since a polarization direction of the recording/reproduction beam L1 that is irradiated to the holographic data storage medium 600 is at right angles to a polarization direction of recording/reproduction beam L2 that is reflected by the holographic data storage medium 600, the first beam splitter 526 can separate the recording/reproduction beam L1 that is incident to the holographic data storage medium 600 from the recording/reproduction beam L2 that is reflected by the holographic data storage medium 600.

The polarization converter 528 converts the polarization of incident light differently according to a region. For instance, referring to FIG. 11, a light emission surface of the polarization converter 528 is divided into a non-conversion region 528a and a polarization conversion region 528b. The non-conversion region 528a emits P-polarized light emitted by the first light source 510 without converting the polarization of the P-polarized light irrespective of a recording mode or a reproduction mode. The polarization conversion region 528b converts P-polarized light emitted by the first light source 510 into S-polarized light in the recording mode and emits the P-polarized light emitted by the first light source 510 without converting the polarization of the P-polarized light in the reproduction mode. In the polarization converter 528 shown in FIG. 11, the non-conversion region 528a corresponds to a central region of the light emission surface and the polarization conversion region 528b corresponds to an outer region thereof. However, the present invention is not limited thereto. In other words, it is also possible that the polarization conversion region 528b may correspond to a central region of the light emission surface and the non-conversion region 528a may correspond to an outer region thereof. In the above-described polarization converter 528, the non-conversion region 528a may be formed of a transparent material, and the polarization conversion region 528b may include, for example, an active half-wave plate. The active half-wave plate of the polarization conversion region 528b is disposed such that its optical axis (esp., a fast axis) makes an angle of 45° with the polarization direction of incident P-polarized light, so that the active half-wave plate can convert P-polarized light into S-polarized light in the recording mode. Meanwhile, since the non-conversion region 528a directly transmits P-polarized light irrespective of a recording mode or a reproduction mode, P-polarized light transmitted through the non-conversion region 528a that is a central region of the light emission surface corresponds to a reference beam L12, while S-polarized light of which polarization is converted by the polarization conversion region 528b that is a peripheral region of the light emission surface corresponds to a signal beam L11. The signal beam L11 and the reference beam L12, which are divided into external light flux and internal light flux, travel through the polarization-selective refractor 530 along the same light path.

The polarization-selective refractor 530 is disposed near the light emission surface of the polarization converter 528 and has a different refractive index according to a polarization direction. For example, the polarization-selective refractor 530 directly transmits P-polarized light and refracts S-polarized light. The polarization-selective refractor 530 may be an LC lens or a polarization hologram device, which has a different refractive index according to a polarization direction. The LC lens employs a double refraction characteristic of LCs. When a voltage is applied to the LCs, the LC lens has different refractive indices with respect to P-polarized light and S-polarized light due to the alignment of LC molecules. The polarization hologram device has a different refractive index according to the polarization direction of incident light. The polarization hologram device refracts light of a polarization element and transmits light of another polarization element owing to a staircase or blazed hologram pattern. Since the LC lens or the polarization hologram device is known to one of ordinary skill, a detailed description thereof will be omitted.

Referring to FIG. 11, since the P-polarized reference beam L12 is incident to a first refractor region 530a of the polarization-selective refractor 530 corresponding to the non-conversion region 528a of the polarization converter 528 in a recording mode, the reference beam L12 is transmitted through the first refractor region 530a without refraction. On the other hand, since the S-polarized signal beam L11 is incident to a second refractor region 530b of the polarization-selective refractor 530 corresponding to the polarization conversion region 528b of the polarization converter 528, the signal beam L11 is refracted by the second refractor region 530b and transmitted.

The quarter-wave plate 532 shifts the polarization direction of light incident to the holographic data storage medium 600 and the polarization direction of light reflected by the holographic data storage medium 600. Thus, a path of the reproduction beam L2 reflected by the holographic data storage medium 600 is separated from a path of the recording/reproduction beam L1 incident to the holographic data storage medium 600, so that the first PD 570 can detect the reproduction beam L2.

The object lens 534 condenses the signal recording/reproduction beam L1 and the servo beam L3 on a predetermined region of the holographic data storage medium 600. As described above, the signal beam L11 and the reference beam L12 have different polarizations, and the polarization-selective refractor 530 has a different refractive index according to its polarization direction. Therefore, the signal beam L11 and the reference beam L12 may have different focal distances from the object lens 534. In this case, the refractive index of the object lens 534 or the polarization-selective refractor 530 is designed such that the reference beam L12 has a shorter focal distance than the signal beam L11, so that the reference beam L12 directly converges into a focus (refer to F, shown in FIG. 11) of the data layer 671 and the signal beam L11 is reflected by a reflection layer (refer to 640, shown in FIG. 11) and converges into the focus F of the data layer 671. The foregoing optical design may differ according to a specific positional relationship between optical devices and the specification of the holographic data storage medium 600.

The second light source 550 is a light source that emits the servo beam L3, for example, a semiconductor laser diode (LD). The second light source 550 may emit a linearly polarized beam L3 in a direction, so that the servo beam L3 incident from the second beam splitter 560 to the holographic data storage medium 600 can be divided from a servo beam L4 reflected by the holographic data storage medium 600 on the basis of a polarization direction as described later. A diffraction grating (not shown) may be further prepared in front of the second light source 550 and diffracts the servo beam L3 emitted by the second light source 550 to 0- and ±1-order diffraction light so that a servo error signal can be tracked using a push-pull tracking method. In the current embodiment, it is exemplarily described that the optical pickup unit 500 includes an additional light source for emitting a servo beam with a different wavelength from the recording/reproduction beam L1. However, in another embodiment, the first light source 510 for emitting the recording/reproduction beam L1 may also function as a servo light source.

The second beam splitter 560 may be a polarization beam splitter. As described later, since the polarization direction of the servo beam L3 irradiated to the holographic data storage medium 600 is at right angles to the polarization direction of the servo beam L4 reflected by the holographic data storage medium 600, the second beam splitter 560 separates a light path of the servo beam L3 incident to the holographic data storage medium 600 from a light path of the servo beam L4 reflected by the holographic data storage medium 600.

The second focus control unit 562 may include, for example, a beam expander including a group of relay lenses 563 and 564, as shown in FIG. 9, or embodied using an LC lens 562' in the optical pickup unit 500' as shown in FIG. 13. The second focus control unit 562 functions to control the height of a focus of the servo beam L3 in the holographic data storage medium 600. Since the second focus control unit 562 is substantially the same as the foregoing first focus control unit 520, a repeated description will be omitted.

The third beam splitter 566 transmits the reproduction beam L2, which is emitted by the first light source 510 and reflected by the holographic data storage medium 600, and functions as a mirror that reflects the servo beams L3 and L4 emitted by the second light source 550. The third beam splitter 566 may have a reflection layer designed to selectively transmit or reflect light according to a wavelength.

The first PD 570 detects the reproduction beam L2, which is emitted by the first light source 510, reflected by the holographic data storage medium 600, and transmitted through the first and third beam splitters 526 and 566.

The second PD 572 detects the servo beam L4, which is emitted by the second light source 550, reflected by the holographic data storage medium 600, and transmitted through the first through third beam splitters 526, 560, and 566.

Referring to FIG. 11, the holographic data storage medium 600 is a reflective data storage medium in which a substrate 610, a servo layer 620, a buffer layer 630, a reflection layer 640, a space layer 650, a holographic recording layer 660, and a cover layer 690 are sequentially stacked.

The holographic recording layer 660 includes a data recording region 670 and a layer discrimination region 680. The data recording region 670 includes the data layer 671 for recording data or reading recorded data. Before data is recorded, the data layer 671 is virtually disposed and not physically different from the remaining portion of the data recording region 670. Since the holographic data storage medium 600 is substantially the same as the holographic data storage mediums described with reference to FIGS. 1 through 8, a repeated description will be omitted.

Hereinafter, a method of recording/reproducing holographic data using the holographic data recording/reproduction apparatus shown in FIG. 9 according to an example embodiment of the present invention will be described with reference to FIGS. 10 and 11.

Referring to FIG. 10, the holographic data recording/reproduction apparatus reads layer discrimination data stored in the layer discrimination region 680 by locating the object lens 534 of the optical pickup unit 500 over the layer discrimination region 680, thereby confirming a focal position F of the object lens 534. In this case, the recording/reproduction beam L1 emitted by the first light source 510 may be irradiated to the layer discrimination region 680. In particular, the layer discrimination data can be read from the layer discrimination region 680 using the reference beam (refer to L12, shown in FIG. 11) that converges into a focus directly after it passes through the cover layer (refer to 690, shown in FIG. 11). Next, the focal position F of the object lens 534 is varied to a reflection layer 681 of the layer discrimination region 680 corresponding to the data layer 671 to/from which data is recorded and read. The variation of the focal position F of the object lens 534 is enabled by the first focus control unit 520. As described above, the position of the data layer 671 can be discriminated only using the reference beam L12, so that the polarization converter 528 can directly transmit the recording/reproduction beam L1 emitted by the first light source 510 without converting the polarization of the beam L1.

Thereafter, the holographic data recording/reproducing apparatus moves the object 534 to the data recording region 670, while maintaining the focal position F of the object lens 534, so that data is recorded to or read from the data layer 671.

Referring to FIG. 11, the signal beam L11 and the reference beam L12 are incident to the holographic data storage medium 600 through the same object lens 534. The signal beam L11 is reflected by the reflection layer 640 and converges into the focus F in the data layer 671 of the holographic recording layer 660, while the reference beam L12 is incident to the cover layer 690 and converges into the focus F in the data layer 671. Since the signal beam L11 and the reference beam L12 converge into the focus F in the data layer 671, an interference fringe is formed in the data layer 671. The shape of the interference fringe varies with a modulation state of the signal beam L11 or modulation states of the signal beam L11 and the reference beam L12, thereby recording data in the data layer 671 due to the interference fringe. The interference fringe may be recorded on the same surface according to a track and form the data layer 671 in the data recording region 671. Also, interference fringes are formed by varying a focal position in a depthwise direction of the data recording region 670, so that data can be recorded by a single bit in a multi-layered data layer 671. The present embodiment describes that the holographic data storage medium is of a micro-holographic type in which single-bit data is recorded in an interference fringe for each focus F, but the present invention is not limited thereto. For example, the present invention may be applied to a volume-holographic-type data storage medium so that a spot of the signal beam L11 overlaps a spot of the reference beam L12 at the focus F to form a three-dimensional interference fringe, thereby recording a plurality of data at the same time.

In the present embodiment as described above, the holographic data storage medium 600 further includes the layer discrimination region 680 and thus, the volume holographic recording layer 660 can determine the data layer 671. Although the present embodiment describes that the position of the data layer 671 is discriminated using the recording/reproduction beam L1 emitted by the first light source 510 as shown in FIG. 9, the present invention is not limited thereto. That is, the position of the data layer 671 may be discriminated using the servo beams L3 and L4 emitted by the second light source 550 as described later.

The present embodiment describes a single-sided apparatus and method for recording/reproducing holographic data using a reflective holographic data storage medium with a layer discrimination region, but the present invention is not limited thereto. For instance, the present invention may be applied to a double sided apparatus and method for recording/reproducing holographic data using the transmissive holographic data storage medium with the layer discrimination region, as shown in FIG. 1 or FIG. 5. In this case, although an optical system including an object lens is disposed on each of both sides of a holographic data storage medium, a data layer is discriminated and then, data is recorded to or reproduced from the data layer as in the previous embodiment.

Figure 12:
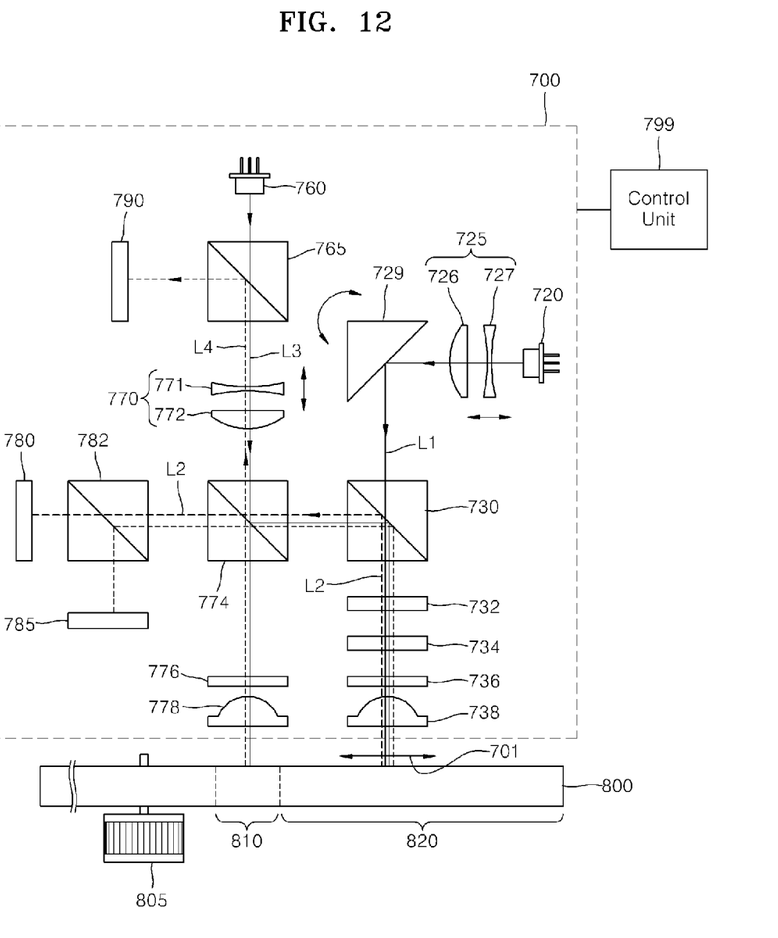
FIG. 12 is a view showing the construction of a holographic data recording/reproduction apparatus according to another example embodiment of the present invention.

FIG. 12 is a view showing the construction of a holographic data recording/reproduction apparatus according to another example embodiment of the present invention.

Referring to FIG. 12, the holographic data recording/reproduction apparatus records data to a holographic data storage medium 800 and reproduces the recorded data. The holographic recording/reproduction apparatus includes an optical pickup unit 700, which irradiates light to a single side of the holographic data storage medium 800 and receives the irradiated light, and a control unit 799.

The optical pickup unit 700 may include first and second light sources 720 and 760, first and second focus control units 725 and 770, a light path converter 729, first, second, third, and fourth beam splitters 730, 765, 774, and 782, a polarization converter 732, a polarization-selective refractor 734, first and second quarter-wave plates 736 and 776, first and second objective lenses 738 and 778, and first, second, and third photo-diodes (PDs) 780, 785, and 790.

In the present embodiment, a layer discrimination optical system for reading layer discrimination data from a layer discrimination region 810 is separated from a data recording optical system for recording data in a data recording region 820. Since each of optical devices of the layer discrimination optical system and the data recording system is substantially the same as optical devices described with reference to FIG. 9, differences will be principally explained.

The first light source 720 emits a recording/reproduction beam L1, and the second light source 760 emits a servo beam L3.

The first focus control unit 725 may include, for example, a beam expander including a group of relay lenses 726 and 727, as shown in FIG. 12, or embodied using an LC lens, like the LC lens 520' shown in FIG. 13. In this case, at least one lens (e.g., the lens 726) of the group of relay lenses 726 and 727 may be movably installed in an optical axis direction and driven by a driver unit (not shown).

The light path converter 729 is a mirror for appropriately folding a light path and allows an optical device to be appropriately disposed in the optical pickup unit 700. Also, the light path converter 729 two-dimensionally moves a reflection surface in response to a tilt of the holographic data storage medium 800 so that the optical pickup unit 700 corresponds to the tilt of the holographic data storage medium 800.

The first beam splitter 730 may function as a polarization beam splitter for the recording/reproducing beam L1, which is emitted by the first light source 720, and function as a simple reflection mirror for the servo beam L3 emitted by the second light source 760. In this case, the recording/reproduction beam L1 and the servo beam L3 are prepared to have different wavelengths so that the recording/reproduction beam L1 can have different reflective characteristics from the servo beam L3. Since a polarization direction of the recording/reproduction beam L1 that is irradiated to the holographic data storage medium 800 is at right angles to a polarization direction of a recording/reproduction beam L2 that is reflected by the holographic data storage medium 800, the first beam splitter 730 can separate the recording/reproduction beam L1 that is incident to the holographic data storage medium 800 from the recording/reproduction beam L2 that is reflected by the holographic data storage medium 800.

The polarization converter 732 converts the polarization of incident light differently according to a region, for example, as described with reference to FIGS. 9 and 11.

The polarization-selective refractor 734 is disposed near a light emission surface of the polarization converter 732 and has a different refractive index according to a polarization direction. For example, the polarization-selective refractor 734 directly transmits P-polarized light and refracts S-polarized light. The polarization-selective refractor 734 may be an LC lens or a polarization hologram device, which has a different refractive index according to a polarization direction.

The quarter-wave plate 736 shifts the polarization direction of light incident to the holographic data storage medium 800 and the polarization direction of light reflected by the holographic data storage medium 800. Thus, a path of the reproduction beam L2 reflected by the holographic data storage medium 800 is separated from a path of the recording/reproduction beam L1 incident to the holographic data storage medium 800, so that the first photo-diode (PD) 780 can detect the reproduction beam L2.

The object lens 738 condenses the signal recording/reproduction beam L1 and the servo beam L3 on a predetermined region of the holographic data storage medium 800.

The second light source 760 is a light source that emits the servo beam L3, for example, a semiconductor laser diode (LD). The second light source 760 may emit a linearly polarized beam L3 in a direction, so that the servo beam L3 incident from the second beam splitter 765 to the holographic data storage medium 800 can be divided from a servo beam L4 reflected by the holographic data storage medium 800 on the basis of a polarization direction as described later.

The second beam splitter 765 may be a polarization beam splitter. Since the polarization direction of the servo beam L3 irradiated to the holographic data storage medium 800 is at right angles to the polarization direction of the servo beam L4 reflected by the holographic data storage medium 800, the second beam splitter 765 separates a light path of the servo beam L3 incident to the holographic data storage medium 800 from a light path of the servo beam L4 reflected by the holographic data storage medium 800.

The second focus control unit 770 may include, for example, a beam expander including a group of relay lenses 771 and 772, as shown in FIG. 12, or embodied using an LC lens, like the LC lens 562' shown in FIG. 13. The second focus control unit 770 functions to control the height of a focus of the servo beam L3 in the holographic data storage medium 800. Since the second focus control unit 880 is substantially the same as the foregoing first focus control unit 725, a repeated description will be omitted.

The third beam splitter 774 is transparent to the beam L2, which is emitted by the first light source 760 and reflected by the holographic data storage medium 800, and semitransparent to the servo beam L3 emitted by the second light source 760. That is, the third beam splitter 566 branches the servo beam L3 emitted by the second light source 760 into part of the servo beam L3, which is irradiated to the layer discrimination region 810 of the holographic data storage medium 800, and the other part of the servo beam L3, which is irradiated to the data recording region 820 of the holographic data storage medium 800.

The fourth beam splitter 782 transmits the reproduction beam L2, which is emitted by the first light source 760 and reflected by the holographic data storage medium 800, and functions as a mirror that reflects the servo beam L4 emitted by the second light source 550. The fourth beam splitter 782 may have a reflection layer designed to selectively transmit or reflect light according to a wavelength.

The reproduction beam L2 reflected by the holographic data storage medium 800 passes through the first, third, and fourth beam splitters 730, 774, and 785 and travels to the first PD 780.

The first PD 780 receives the reproduction beam L2 reflected by the holographic data storage medium 800 and reads data recorded in the data recording region 820.

The part of the servo beam L3 that is emitted by the second light source 760 and branched by the third beam splitter 774, passes through the second quarter-wave plate 776 and the second object lens 778, is reflected by the layer discrimination region 810, passes through the third and fourth beam splitters 774 and 782, and travels to the second PD 785.

The second PD 785 reads the layer discrimination data stored in the layer discrimination region 810. Based on the read layer discrimination data, the second PD 785 drives the first focus control unit 725 and controls a focus of the data recording optical system including the first object lens 738 to be in a data layer of the data recording region 820 to/from which data is recorded/read, and drives the second focus control unit 770 and controls a focus of the layer discrimination optical system to be in a reflection layer of the layer discrimination region 810 corresponding to the data layer of the data recording region 820.

The other part of the servo beam L3 that is emitted by the second light source 760 and branched by the third beam splitter 774 is reflected by the first beam splitter 730 and irradiated to the data recording region 820 of the holographic data storage medium 800. Thereafter, the other part of the servo beam L3 is reflected by a servo layer (refer to 220, shown in FIG. 3) prepared in the holographic data storage medium 800 and incident to the third PD 790 via first, third, and fourth beam splitters 730, 774, and 765.

The third PD 790 reads servo data from the holographic data storage medium 800.

The holographic data recording/reproduction apparatus having the above-described construction can read the layer discrimination data from the layer discrimination region 810 using the second object lens 778 and simultaneously, record data in the corresponding data layer or read the recorded data by moving the first object lens 738 in a cross-track direction 701.

The present embodiment describes a single-sided apparatus and method for recording/reproducing holographic data using a reflective holographic data storage medium with a layer discrimination region, but the present invention is not limited thereto. For instance, the present invention may be applied to a double sided apparatus and method for recording/reproducing holographic data using the transmissive holographic data storage medium with the layer discrimination region, as shown in FIG. 1 or FIG. 5. In this case, in addition to data recording optical systems provided on both sides of the holographic data storage medium, the apparatus further includes a layer discrimination optical system disposed on any one of both sides of the holographic data storage medium, so that the apparatus can read layer discrimination data from the layer discrimination region using the layer discrimination optical system and simultaneously, record/reproduce data using the data recording optical systems.

As described above, a holographic data storage medium and an apparatus and method for recording/reproducing holographic data to/from the same can provide discrimination between a plurality of data layers in a volume holographic recording layer.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. Many modifications, permutations, additions, and sub-combinations may be made to adapt the teachings of the present invention to a particular situation without departing from the scope thereof. For example, the holographic recording layer can be disposed between the substrate and the cover layer differently than in the examples shown in FIGS. 1, 3, 5, and 7. In addition, the layer discrimination region of the holographic recording layer may be configured differently or provided with different shapes than in the examples shown in FIGS. 2, 4, 6, and 8. Accordingly, it is intended that the present invention not be limited to the various example embodiments disclosed herein, but that the present invention includes all embodiments falling within the scope of the appended claims.

What is claimed is:

1. A holographic data storage medium comprising:
  a substrate;
  a cover layer; and
  a holographic recording layer disposed between the substrate and the cover layer;
  wherein the holographic recording layer comprises:
    a layer discrimination region comprising a plurality of reflection layers separated to each other in a depth direction of the holographic recording layer; and
    a data recording region being separated from the layer discrimination region;
    data is recorded by interference fringes produced by a first beam interfering with a second beam at different depths in the data recording region so that a plurality of data layers formed of the interference fringes are arranged in a depthwise direction of the holographic recording layer;
    a height of each of the data layers in a depth direction of the holographic recording layer is equal to a height of an associated one of the reflection layers in the depth direction of the holographic recording layer; and
    before data is recorded, the data layers do not exist physically in the data recording region.

2. The medium of claim 1, wherein the reflection layers are stepped in a staircase shape.

3. The medium of claim 1, wherein each of the reflection layers stores layer discrimination data of the associated data layer.

4. The medium of claim 1, wherein the holographic recording layer has a disk shape; and
  the layer discrimination region is disposed near an inner circumferential area or an outer circumferential area of the disk-shaped holographic recording layer.

5. The medium of claim 1, wherein a material of the data recording region of the holographic recording layer is a photosensitive material selected from the group consisting of a photo-polymer and a thermoplastic resin.

6. The medium of claim 1, wherein the data recorded by the interference fringes is recorded in units of a single bit.

7. The medium of claim 1, wherein the medium is a transmissive-type medium in which the substrate and the cover layer are transparent to the first beam and the second beam so that the first beam and the second beam may be incident to one side of the holographic recording layer through the substrate, or may be incident to another side of the holographic recording medium through the cover layer.

8. The medium of claim 1, wherein the medium is a reflective-type medium comprising a reflection layer disposed between the substrate and the holographic recording layer so that the first beam and the second beam may be incident to the holographic recording layer only through the cover layer.

9. The medium of claim 8, wherein the first beam and the second beam are polarized beams that intersect each other; and
  the reflection layer is a polarization-selective reflection layer that reflects the first beam and transmits the second beam.

10. The medium of claim 9, wherein a material of the reflection layer is a cholesteric liquid crystal (CLC) material.

11. The medium of claim 10, wherein the reflection layer is a liquid crystal (LC) film that is in a liquid state or cured.

12. The medium of claim 10, wherein the reflection layer comprises a single liquid crystal (LC) layer or a plurality of LC layers with different LC-molecule helical periods.

13. The medium of claim 8, further comprising a servo layer to record servo data disposed between the substrate and the reflection layer, or between the reflection layer and the holographic recording layer, or in the holographic recording layer, or between the holographic recording layer and the cover layer.

14. The medium of claim 8, wherein servo data is recorded in the reflection layer.

15. The medium of claim 8, further comprising a space layer disposed between the reflection layer and the holographic recording layer.

16. A holographic data recording/reproducing apparatus for reproducing data from a holographic data storage medium, the apparatus comprising:
  an optical pickup unit to irradiate light to the holographic data storage medium, the holographic data storage medium comprising a holographic recording layer, the holographic recording layer comprising:
    a layer discrimination region comprising a plurality of reflection layers separated to each other in a depth direction of the holographic recording layer; and
    a data recording region being separated from the layer discrimination region;
    wherein data is recorded by interference fringes produced by a first beam interfering with a second beam at different depths in the data recording region so that a plurality of data layers formed of the interference fringes are arranged in a depthwise direction of the holographic recording layer;
    a height of each of the data layers in a depth direction of the holographic recording layer is equal to a height of an associated one of the reflection layers in the depth direction of the holographic recording layer; and
    before data is recorded, the data layers do not exist physically in the data recording region;
  a controller to control the optical pickup unit to:
    irradiate light to the layer discrimination region to read layer discrimination data stored in the layer discrimination region; and
    record data in or read recorded data from different data layers of the data recording region based on the layer discrimination data.

17. The apparatus of claim 16, wherein the optical pickup unit comprises:
  a light source to emit light;
  an object lens optical system to irradiate light to the layer discrimination region and the data recording region, and receive reflected light; and
  a focus control unit to control a focus of the light irradiated to the data recording region to be in a data layer in which data is to be recorded or from which data is to be read based on the layer discrimination data.

18. The apparatus of claim 17, wherein the object lens optical system reads the layer discrimination data from the layer discrimination region, moves to the data recording region, and records data in or reads recorded data from the data recording region based on the layer discrimination data.

19. The apparatus of claim 17, wherein the object lens optical system comprises:

a layer discrimination optical system to read the layer discrimination data from the layer discrimination region; and a data recording optical system to record data in the data recording region or read recorded data from the data recording region;

wherein the layer discrimination optical system and the data recording optical system have a same focal height on the holographic data storage medium so that the data recording optical system records data in a selected data layer of the plurality of data layers or reads recorded data from the selected data layer, the selected data layer having a same height as the focal height of the layer discrimination optical system.

20. The apparatus of claim 17, wherein the light irradiated to the data recording region comprises a first beam and a second beam that interfere to produce the interference fringes; and the light irradiated to the layer discrimination region is the first beam or the second beam.

21. The apparatus of claim 17, wherein the optical pickup unit further comprises a servo optical system to track a recording position in the holographic data storage medium.

22. The apparatus of claim 21, wherein the light irradiated to the layer discrimination region is a servo beam emitted by the servo optical system.

23. The apparatus of claim 17, wherein the focus control unit is a beam expander or a liquid crystal (LC) lens.

24. The apparatus of claim 17, wherein the data recorded by the interference fringes is recorded in units of a single bit.

25. A method of recording/reproducing holographic data, the method comprising:

irradiating light to a holographic data storage medium, the holographic data storage medium comprising a holographic recording layer, the holographic recording layer comprising:

a layer discrimination region comprising a plurality of reflection layers separated to each other in a depth direction of the holographic recording layer; and a data recording region being separated from the layer discrimination region;

wherein data is recorded by interference fringes produced by a first beam interfering with a second beam at different depths in the data recording region so that a plurality of data layers formed of the interference fringes are arranged in a depthwise direction of the holographic recording layer;

a height of each of the data layers in a depth direction of the holographic recording layer is equal to a height of an associated one of the reflection layers in the depth direction of the holographic recording layer; and before data is recorded, the data layers do not exist physically in the data recording region;

reading layer discrimination data stored in the layer discrimination region; and recording data in or reading recorded data from different data layers of the data recording region based on the layer discrimination data.

26. The method of claim 25, wherein the reading of layer discrimination data comprises:

locating an optical pickup unit over the layer discrimination region;

controlling a focal position of the optical pickup unit to have a same height on the holographic data storage medium as a selected data layer of the plurality of data layers in which data is to be recorded or from which recorded data is to be read; and reading layer discrimination data from the layer discrimination region using the optical pickup unit at the controlled focal position; and the recording of data in or reading of recorded data from different data layers of the data recording region comprises:

moving the optical pickup unit to the data recording region while maintaining the optical pickup unit at the controlled focal position; and recording data in or reading recorded data from the selected data layer based on the layer discrimination data using the optical pickup unit at the controlled focal position.

27. The method of claim 25, wherein the reading of layer discrimination data and the recording of data in or reading of recorded data from different data layers of the data recording region comprises:

locating a layer discrimination optical system of an optical pickup unit over the layer discrimination region;

controlling a focal position of a data recording optical system of the optical pickup unit to have a same height as a selected data layer of the plurality of data layers in which data is to be recorded or from which recorded data is to be read while reading the layer discrimination data using the layer discrimination optical system; and recording data in or reading recording data from the selected data layer using the data recording optical system at the controlled focal position based on the laser discrimination data while the layer discrimination optical system is located over the layer discrimination region.

28. The method of claim 25, wherein the data recorded by the interference fringes is recorded in units of a single bit.

* * * * *